(12) United States Patent
Chu et al.

(10) Patent No.: US 7,621,355 B2
(45) Date of Patent: Nov. 24, 2009

(54) OMNIWHEEL AND VEHICLE USING THE SAME

(75) Inventors: Kao-Hone Chu, Kaohsiung (TW); Hung-Cheng Yen, Kaohsiung (TW); Hsuan-Kuan Huang, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 204 days.

(21) Appl. No.: 11/692,927

(22) Filed: Mar. 29, 2007

(65) Prior Publication Data

US 2008/0156616 A1 Jul. 3, 2008

(30) Foreign Application Priority Data

Dec. 28, 2006 (TW) ............................... 95149454 A

(51) Int. Cl.
*B62D 57/00* (2006.01)
(52) U.S. Cl. ...................... 180/7.2; 301/5.23
(58) Field of Classification Search ................ 180/7.2, 180/7.1; 301/5.23
See application file for complete search history.

(56) References Cited

U.S. PATENT DOCUMENTS

| | | | | | |
|---|---|---|---|---|---|
| 3,249,089 | A | * | 5/1966 | Laben et al. ................ 399/239 |
| 3,575,460 | A | * | 4/1971 | Kennedy ..................... 296/160 |
| 3,746,112 | A | * | 7/1973 | Ilon ............................ 180/6.2 |
| 3,876,255 | A | * | 4/1975 | Ilon ............................ 301/5.23 |
| 4,237,990 | A | * | 12/1980 | La ............................... 180/7.1 |
| 4,715,460 | A | * | 12/1987 | Smith .......................... 180/7.1 |
| 4,716,837 | A | * | 1/1988 | Valencia ....................... 104/38 |
| D294,074 | S | * | 2/1988 | Sogge .......................... D34/29 |
| 4,907,692 | A | * | 3/1990 | Sogge .......................... 198/780 |
| 5,186,270 | A | * | 2/1993 | West .......................... 180/6.62 |
| 5,374,879 | A | * | 12/1994 | Pin et al. .................... 318/139 |
| 5,701,966 | A | * | 12/1997 | Amico ........................ 180/7.2 |
| 6,340,065 | B1 | * | 1/2002 | Harris ......................... 180/7.2 |
| 6,360,865 | B1 | | 3/2002 | Leon |
| 6,409,010 | B1 | * | 6/2002 | Leon .......................... 198/786 |
| 6,547,340 | B2 | * | 4/2003 | Harris ........................ 301/5.23 |
| 6,630,865 | B2 | * | 10/2003 | Huon et al. ................. 330/262 |
| 6,668,950 | B2 | * | 12/2003 | Park ............................ 180/7.1 |
| 2005/0284326 | A1 | * | 12/2005 | Leisner et al. ................ 104/91 |

FOREIGN PATENT DOCUMENTS

EP 1361109 A2 * 11/2003
JP 09189891 A * 7/1997

* cited by examiner

*Primary Examiner*—Tony H. Winner
(74) *Attorney, Agent, or Firm*—Jianq Chyun IP Office

(57) ABSTRACT

An omniwheel is provided, which includes an omniwheel shaft, two wheel covers fixed at two ends of the omniwheel shaft, and a plurality of roller sets. The roller sets are coupled between the two wheel covers. Each of the roller sets has a plurality of rollers and at least one coupler, and each of the rollers has a roller shaft. The roller shafts are coupled with each other via the coupler, and each of the roller sets is respectively coupled to the wheel covers via the rollers disposed at two ends of the roller set. The omniwheel shaft and the roller shaft are inclined with respect to each other at an angle.

15 Claims, 3 Drawing Sheets

OMNIWHEEL AND VEHICLE USING THE SAME

CROSS-REFERENCE TO RELATED APPLICATION

This application claims the priority benefit of Taiwan application serial no. 95149454, filed Dec. 28, 2006. All disclosure of the Taiwan application is incorporated herein by reference.

BACKGROUND OF THE INVENTION

1. Field of the Invention

The present invention relates to an omniwheel and a vehicle using the same.

2. Description of Related Art

Omnidirectional movement means moving optionally while keeping in the same orientation, i.e., moving to any direction while keeping the axle center of the wheel and direction of the vehicle head unchanged.

Therefore, an omnidirectional movement wheel type platform is advantageous in moving and turning flexibly, can be made into various carriers and work platforms, and can move in all directions in a narrow space, especially performing a lateral horizontal movement. Currently, the omnidirectional movement wheel type platform has been used in, for example, robots, wheelchairs, forklifts, and work platforms (such as being used for the maintenance of very high airport halls). However, in order to achieve the omnidirectional function, an omniwheel must be adopted.

The most ideal omniwheel is a spherical omniwheel, but the control on the movement of the spherical omniwheel is rather complicated.

In a familiar omniwheel, the rollers at the edge of the wheel are arranged in a right angle relative to the omniwheel shaft. Although such a structure has a simple mechanism design and is easy to control, the wheel type platform achieves an omnidirectional function only when the configuration of the wheel and power is arranged in a special configuration. The often seen configuration of the wheel is cross-shaped or triangular. In order to achieve a specific configuration, it is necessary for the platform used together with the omniwheel to have some special structural design, so as to install the omniwheel.

In another so-called Mecanum wheel, the rollers at the edge of the wheel are arranged in an inclined way relative to the omniwheel shaft. The recent Mecanum wheel all adopt a single wheel width design. Although the constitution of such an Mecanum wheel is simple, the applicability is limited due to the fixed wheel width, and the Mecanum wheel can not be used in platforms of different size and load. Moreover, the recent Mecanum wheel is of a single roller design, and generally adopts a material of high hardness. When moving on an uneven ground, the roller may insufficiently contact the ground due to ups and downs of the ground. Besides, the ground-contact area of the wheel is reduced, resulting in an insufficient friction force, which is not advantageous to the movement of a mobile platform.

SUMMARY OF THE INVENTION

In order to solve the above conventional problems, the present invention is directed to provide an omniwheel, which utilizes a simple disassembling/assembling means to add/reduce the number of the rollers according to the load requirement, adjust the wheel width of the omniwheel on demands, and reduce the ground-contact pressure of the omniwheel.

The present invention is also directed to provide an omniwheel, which absorbs the vibration produced when the omniwheel contacts the ground.

The present invention is further directed to provide a vehicle using the aforementioned omniwheel, in which the omnidirectional function is achieved without requiring a special configuration of the arrangement of the omniwheel.

The present invention provides an omniwheel, which comprises an omniwheel shaft, two wheel covers fixed at two ends of the omniwheel shaft, and a plurality of roller sets. The roller sets are coupled between the two wheel covers. Each of the roller sets has a plurality of rollers and at least one coupler, and each of the rollers has a roller shaft. The roller shafts are coupled with each other via the coupler, and each of the roller sets is respectively coupled to the wheel covers via the rollers disposed at two ends of the roller set. The omniwheel shaft and the roller shaft are inclined with respect to each other at an angle.

In the above omniwheel, the coupler includes an elastic coupler.

In the above omniwheel, the load of the omniwheel can be adjusted by replacing the omniwheel shaft and disassembling/assembling the rollers and coupler of the roller sets.

The present invention also provides a vehicle, which includes a main body, and at least two pairs of the abovementioned omniwheel configured at the main body. The pairs of omniwheel have a first inclined angle and a second inclined angle respectively, in which the first inclined angle is opposite to the second inclined angle.

According to the characteristics of the present invention, a roller set replaced the familiar design of single roller, and a coupler is used to connect the plurality of rollers in the roller set. Therefore, a simple disassembling/assembling means can be used to add/reduce the number of rollers according to the load requirement, adjust the wheel width of the omniwheel on demands, and reduce the ground-contact pressure of the omniwheel.

According to the characteristics of the present invention, the plurality of rollers in the roller set are coupled by an elastic coupler, such that not only the function of flexible support is produced, but also the rollers in the roller set more closely contact the outline of ground and object, thereby increasing the ground-contact area of the rollers and reducing the vibration during the movement.

According to the characteristics of the present invention, when hard plastic or alloy is selected as the material of the roller, the abrasion can be reduced; when rubber is selected, the friction coefficient is high, and the vibration absorbability is more preferred.

According to the characteristics of the present invention, when the omniwheel of the present invention is mounted on a vehicle (or wheel type mobile platform), a configuration of two in the front and two at the back is used instead of a special constitution manner, and the vehicle (wheel mobile platform) achieves the omnidirectional movement function by controlling the rotation speed or clockwise/counterclockwise rotation of individual omniwheel.

In order to make the aforementioned and other objectives, characteristics, and advantages of the present invention comprehensible, preferred embodiments accompanied with figures are described in detail below.

DESCRIPTION OF EMBODIMENTS

First Embodiment

Figure 1:
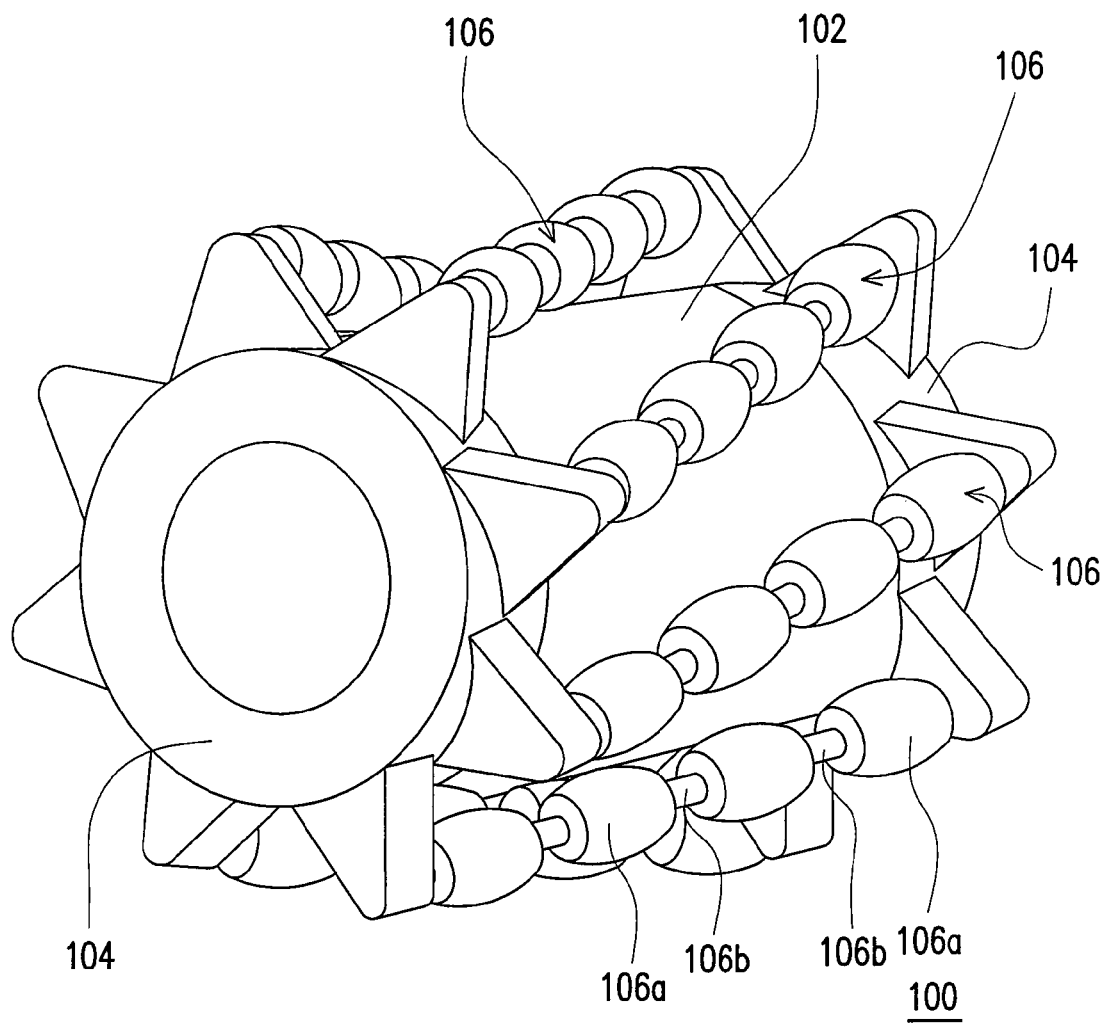
FIG. 1 is a stereogram of an omniwheel according to a first embodiment of the present invention.
Figure 2:
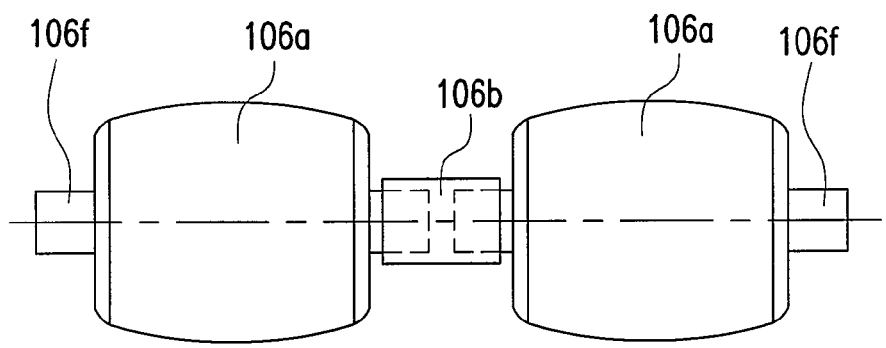
FIG. 2 is a side cross-sectional view of two connected neighboring rollers in a roller set in FIG. 1.
Figure 3:
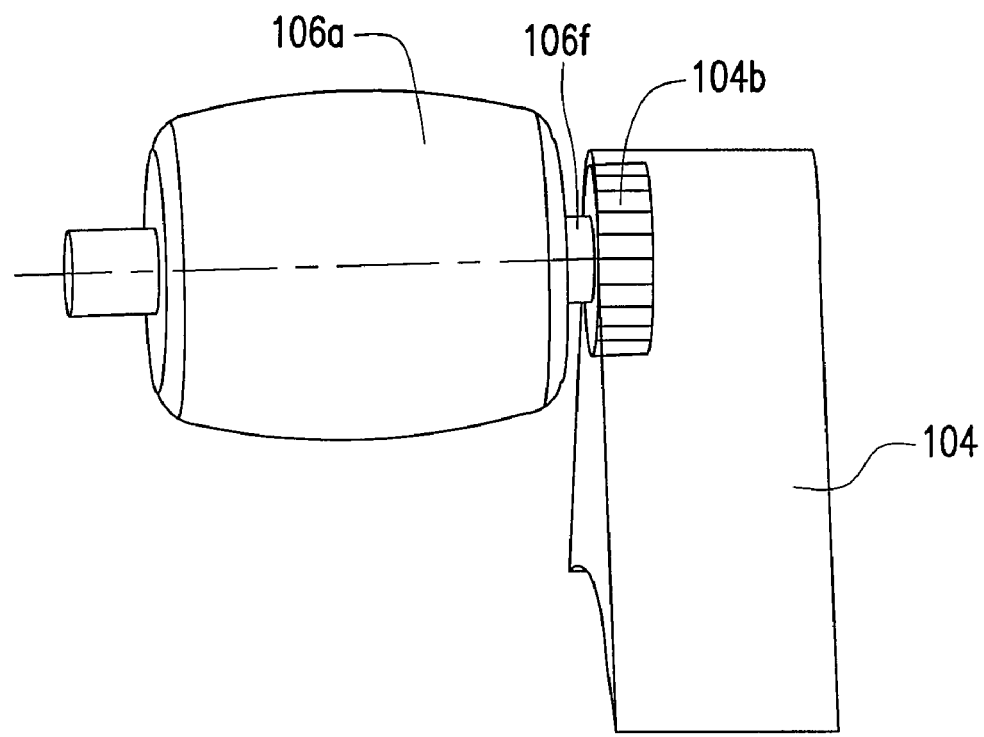
FIG. 3 is a partial enlarged perspective view of a roller set connected to the wheel cover in FIG. 1.

Referring to FIGS. 1, 2, and 3 at the same time, FIG. 1 is a stereogram of an omniwheel according to a first embodiment of the present invention, FIG. 2 is a side cross-sectional view of two rollers in a roller set in FIG. 1, and FIG. 3 is a partial enlarged perspective view of the roller set coupled to the wheel cover in FIG. 1.

The omniwheel 100 includes an omniwheel shaft 102, wheel covers 104 fixed at two ends of the omniwheel shaft 102, and a plurality of roller sets 106.

The above omniwheel shaft 102 is a rigid shaft, for example, a steel tube. The distance between the wheel covers 104 on two sides is determined by the length of the omniwheel shaft 102.

The roller sets 106 are coupled between the wheel covers 104. Each of the roller sets 106 includes a plurality of rollers 106a and at least one coupler 106b. FIG. 1 takes a roller set having four rollers 106a and three couplers 106b as an example. If a roller set 106 only has two rollers 106a, only one coupler 106b is needed. The material of the roller includes hard plastic, rubber, or alloy. When hard plastic or alloy is selected as the material of the roller, the abrasion is reduced; when rubber is selected, the friction coefficient is high, and the vibration absorbability is more preferred.

Each of the rollers 106a has a roller shaft 106f (FIG. 2). The neighboring rollers 106a are coupled with each other by coupling the roller shafts 106f.

Figure 4:
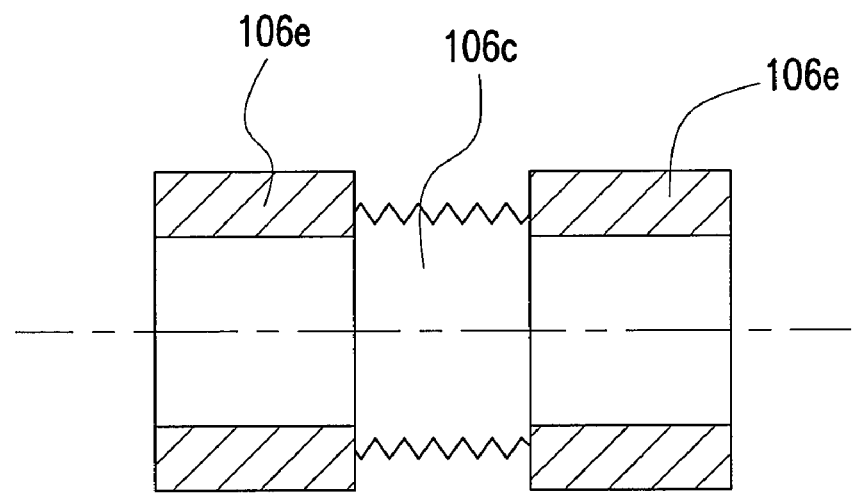
FIG. 4 is an elastic coupler according to the first embodiment of the present invention.

The coupler 106b is an elastic coupler or a general coupler. If an elastic coupler is adopted, as shown in FIG. 4, the elastic coupler includes a medium portion 106c having an elastic material and metal joints 106e fixed at two ends of the medium portion 106c.

A plurality of through holes is set in the outer edge of the wheel cover 104, and a plurality of bearings 104b is mounted, for example, ball bearings. Each of the roller sets 106 is coupled to the wheel covers 104 by the bearings 104b through the roller shafts 106f of the rollers 106a at two ends of the roller set 106.

Figure 5:
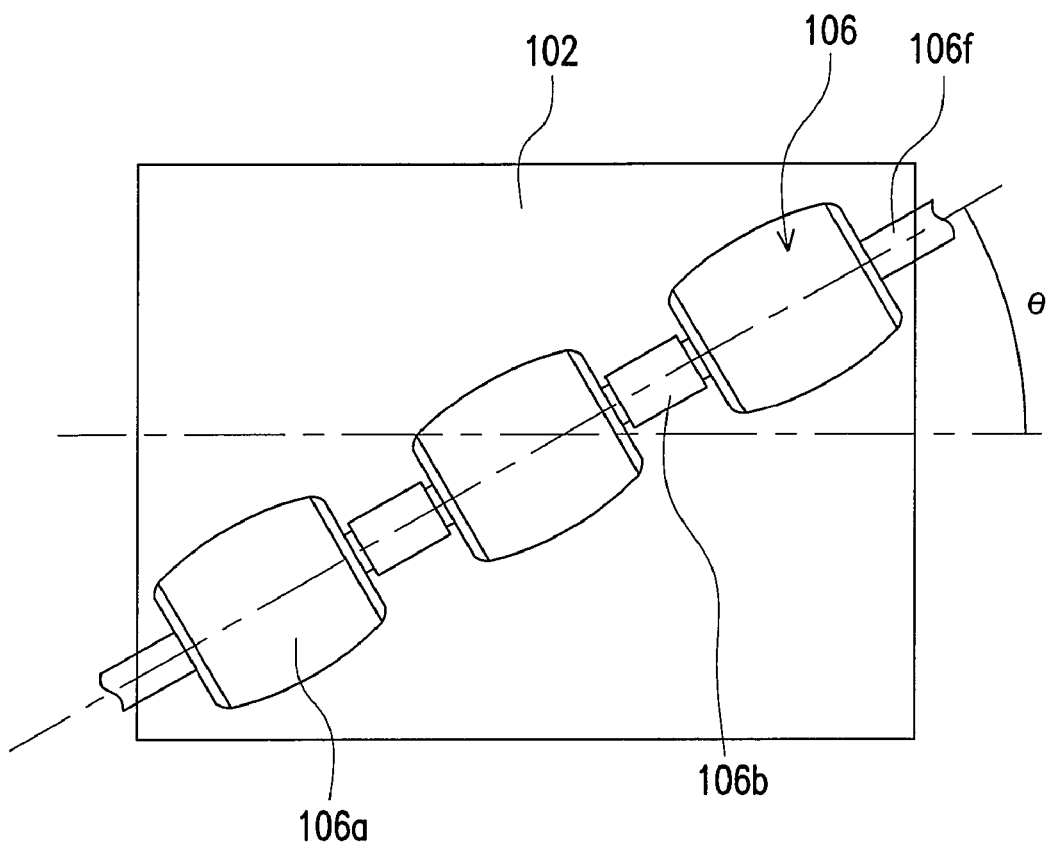
FIG. 5 shows an inclined angle between the shaft line of the omniwheel shaft and that of the roller shaft of the roller sets in FIG. 1.

FIG. 5 is a schematic view of an inclined angle between the omniwheel shaft and the roller shaft of the roller sets.

The shaft line of the omniwheel shaft 102 and that of the roller shaft 106f are inclined with respect to each other at an angle $\theta$, and the range of the $\theta$ is 30° to 60°.

According to the omniwheel 100 of this embodiment, the load of the omniwheel 100 is adjusted by replacing the omniwheel shaft 102 and disassembling/assembling the rollers 106a in the roller set 106 and the coupler 106b.

[Assembly Manner]

First of all, according to the demand on the load of the omniwheel 100, a suitable number of rollers (the number of rollers in each of the roller sets) and size of the omniwheel shaft 102 are selected.

The omniwheel shaft 102 in conformity to the size specification is assembled and fixed to the wheel cover 104 on one side. Next, one end of each of the roller sets 106 is fixed to the wheel cover 104. Then, the other end of each of the roller sets 106 is fixed to the wheel cover 104 on the other side, and the wheel cover 104 on the other side is connected to the omniwheel shaft 102. The relative angle between the two wheel covers 104 is adjusted, such that the shaft lines of the omniwheel shaft 102 and the roller shaft 106f are inclined with respect to each other at a predetermined angle $\theta$.

According to the characteristics of the present invention, the conventional design of a single roller is replaced by a roller set, and the plurality of rollers in the roller set is connected by a coupler, such that a simple disassembling/assembling means is utilized to add/reduce the number of rollers according to the load demand, adjust the wheel width of the omniwheel on demands, and reduce the ground-contact pressure of the omniwheel.

When the load of the omniwheel is needed to be adjusted, an omniwheel shaft of a required size can be altered according to the load demand, and the rollers of each of the roller sets are disassembled or assembled. The load of the omniwheel is changed by the above simple disassembling/assembling means. All the components including the omniwheel shaft (made into various size specifications for replacement), wheel cover, roller, and coupler can be standardized, so as to reduce the design and manufacturing cost of the omniwheel.

According to the characteristics of the present invention, the plurality of rollers in the roller set is coupled by an elastic coupler, such that not only the function of flexible support is produced, but also the rollers in the roller set more closely contact the ground and object, such that the ground-contact area of the roller is increased, thereby reducing the vibration during the movement.

Second Embodiment

Figure 6:
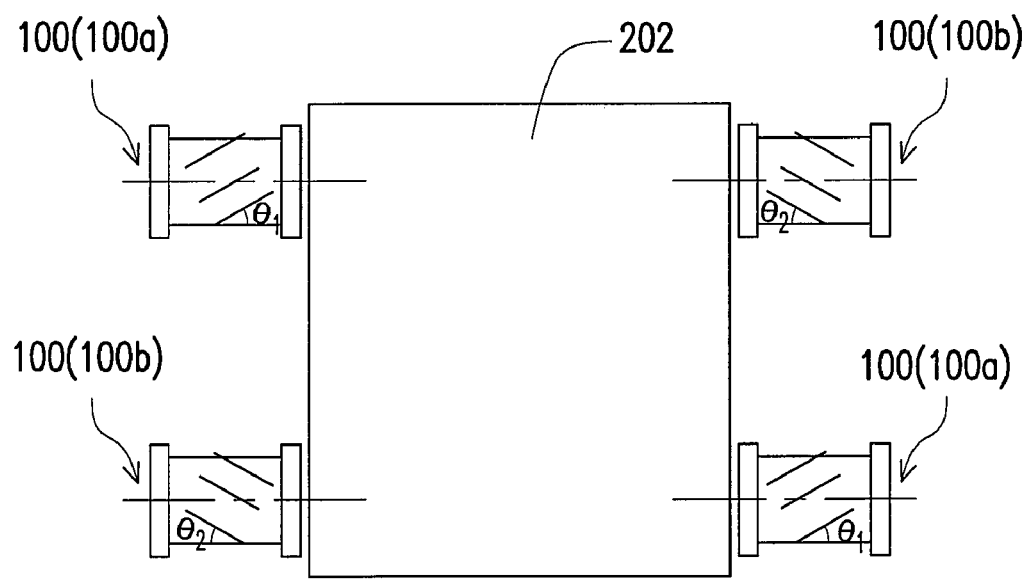
FIG. 6 is a schematic view of the configuration of the vehicle according to a second embodiment of the present invention.

FIG. 6 shows a vehicle applying the omniwheel of the first embodiment.

The vehicle 200 includes a main body 202 and at least two pairs of omniwheel 100 of the first embodiment configured at the main body 202.

Herein, the first pair of omniwheel is marked as 100a, and the second pair of omniwheel is marked as 100b. The two pairs of the omniwheel 100a and 100b have a first inclined angle $\theta 1$ and a second inclined angle $\theta 2$ respectively. The first inclined angle $\theta 1$ and the second inclined angle $\theta 2$ are opposite to each other. For example, if the first inclined angle $\theta 1$ is +45°, thus the second inclined angle $\theta 2$ is −45°, and so forth.

As shown in the figure, one pair of the omniwheel 100a is respectively configured at the left front and right back sides of the main body 202, and the other pair of omniwheel 100b is respectively configured at the left back and right front sides of the main body.

The vehicle of this embodiment adopts the omniwheel of the first embodiment, thus having the advantages of the first embodiment. The load of the whole vehicle is adjusted through a simple disassembling/assembling method. Therefore, the omniwheel can be applied to various types of vehicles, for example, a wheelchair, forklift, work platform, or trolley.

According to the characteristics of the present invention, when the omniwheel of the present invention is mounted on the vehicle (or wheel type mobile platform), a configuration of two in the front and two at the end is used instead of a special constitution manner, and the vehicle (wheel mobile platform) achieves the omnidirectional movement function by controlling the rotation speed or clockwise/counterclockwise rotation of individual omniwheel.

Though the present invention has been disclosed above by the preferred embodiments, they are not intended to limit the present invention. Anybody skilled in the art can make some modifications and variations without departing from the spirit and scope of the present invention. Therefore, the protecting range of the present invention falls in the appended claims.

What is claimed is:

1. An omniwheel, comprising:
   an omniwheel shaft;
   two wheel covers, fixed at two ends of the omniwheel shaft;
   a plurality of roller sets, coupled between the two wheel covers, wherein two ends of each of the roller sets are coupled to the two wheel covers respectively, and each of the roller sets comprises a plurality of rollers and at least one coupler, and each of the rollers has a roller shaft, the roller shafts are coupled with each other via the coupler, and each of the roller sets is respectively coupled to the wheel covers via the rollers disposed at two ends of the roller set;
   wherein the omniwheel shaft and the roller shaft are inclined with respect to each other at an angle.

2. The omniwheel as claimed in claim 1, wherein the coupler comprises an elastic coupler.

3. The omniwheel as claimed in claim 2, wherein the elastic coupler comprises a medium portion of an elastic material and metal joints fixed at two ends of the medium portion.

4. The omniwheel as claimed in claim 2, wherein a load of the omniwheel is adjusted by replacing the omniwheel shaft and disassembling/assembling the rollers and the coupler of the roller sets.

5. The omniwheel as claimed in claim 2, wherein the material of the rollers comprises hard plastic, rubber, or alloy.

6. The omniwheel as claimed in claim 2, further comprising a plurality of bearings, fixed at the wheel covers, and the rollers located at two ends of the roller sets are coupled to the wheel covers through the bearings.

7. The omniwheel as claimed in claim 2, wherein the omniwheel shaft is a rigid shaft.

8. The omniwheel as claimed in claim 1, wherein a load of the omniwheel is adjusted by replacing the omniwheel shaft and disassembling/assembling the rollers and the coupler of the roller sets.

9. The omniwheel as claimed in claim 1, wherein the material of the rollers comprises hard plastic or alloy.

10. The omniwheel as claimed in claim 1, further comprising a plurality of bearings, fixed at the wheel covers, and the rollers located at two ends of the roller sets are coupled to the wheel covers through the bearings.

11. The omniwheel as claimed in claim 1, wherein the omniwheel shaft is a rigid shaft.

12. The omniwheel as claimed in claim 1, wherein the inclined angle is 30°-60°.

13. A vehicle, comprising:
    a main body;
    at least two pairs of the omniwheels as claimed in claim 1, configured at the main body, and having a first inclined angle and a second inclined angle respectively, wherein the first inclined angle and the second inclined angle are opposite to each other.

14. The vehicle as claimed in claim 13, wherein one pair of the omniwheels is respectively configured at a left front side and a right back side of the main body, and the other pair of the omniwheels is respectively configured at a left back side and a right front side of the main body.

15. The vehicle as claimed in claim 13, wherein the vehicle is a wheelchair, a forklift, a work platform, or a trolley.

* * * * *